United States Patent
Williams

(10) Patent No.: US 6,557,545 B2
(45) Date of Patent: May 6, 2003

(54) BARBECUE GRILL

(76) Inventor: Paul L. Williams, 1905 Angelique St., Saint Joseph, MO (US) 64501

( * ) Notice: Subject to any disclaimer, the term of this patent is extended or adjusted under 35 U.S.C. 154(b) by 9 days.

(21) Appl. No.: 09/917,353

(22) Filed: Jul. 30, 2001

(65) Prior Publication Data

US 2003/0019492 A1 Jan. 30, 2003

(51) Int. Cl.[7] .................................................. A47J 37/07
(52) U.S. Cl. .................................. 126/25 R; 126/41 R
(58) Field of Search ............................. 126/25 R, 41 R, 126/39 R, 50; 99/482, 446

(56) References Cited

U.S. PATENT DOCUMENTS

| | | | |
|---|---|---|---|
| 754,557 A | * 3/1904 | Greene | 126/25 R |
| 4,553,525 A | 11/1985 | Ruble | |
| 4,664,026 A | * 5/1987 | Milloy | 126/25 R |
| 4,700,618 A | * 10/1987 | Cox, Jr. | 126/25 R |
| 4,962,697 A | 10/1990 | Farrar | |
| 5,460,159 A | * 10/1995 | Bussey | 126/41 R |
| 5,467,692 A | 11/1995 | Perez, III | |
| 5,673,613 A | * 10/1997 | Price | 126/25 R |
| 5,720,272 A | 2/1998 | Chiang | |
| 5,865,099 A | 2/1999 | Waugh | |
| D409,436 S | 5/1999 | Smith | |
| 6,058,832 A | * 5/2000 | Fountain | 126/25 R |

* cited by examiner

Primary Examiner—Sara Clarke

(57) ABSTRACT

What is disclosed is an improved barbecue grill for outdoor cooking, having an upper cooking chamber portion; a lower fuel storage portion and a countertop member. The upper cooking chamber portion is made up of a hollow cylindrical drum, having a planar rack portion supported horizontally therein. Drum has first and second end plates and a sidewall, with an opening downward in said drum sidewall. Aan arcuate door movably hinged is located on the upward side of said drum. The drum is horizontally positioned and supported upon said countertop member. Countertop member is supported on the lower fuel storage portion and includes an opening therethrough. The lower fuel storage portion is a vertical skirt portion, having an opening upwardly and a bottom plate. A pair of doors covers an aperture in the skirt portion for accessing the interior of said skirt portion. A fuel shelf and a sliding shelf portion for removal of ashes are located inside of the skirt portion.

9 Claims, 4 Drawing Sheets

BARBECUE GRILL

FIELD OF THE INVENTION

This invention relates to a barbecue grill for outdoor cooking, and more particularly to an improved barbecue grill with both a solid fuel burning means, and gas or liquid fuel burning means.

BACKGROUND OF THE INVENTION

Barbecue grills are well known in the prior art. A number of bowl-shaped barbecue grills for burning particular fuels, such as charcoal or liquid fuel are provided in the prior art, some of which also provide wheels to make them transportable.

U.S. Pat. No. 5,865,099 discloses a barbecue grill assembly including a bowl and domed lid mating to form a three-dimensional oval in a support assembly. The assembly includes shelves having stops engageable with the lid. Vent means is suspended beneath a central portion of the bowl, an ash collector, and an ash sweep assembly for cleanup of the ashes within the bowl.

U.S. Pat. No. 5,720,272 (Chiang) discloses a barbecue grill with a first annular wall with an inner side and an outer side, at least one positioning member mounted on the outer side of the first annular wall, and a lid with a sedon annular wall detachably mounted on the first annular wall.

U.S. Pat. No. 5,467,692 (Perez, III) discloses a combination outdoor cooker and smoker including a substantially cylindrical hollow houing having a heat source therein and support grate supported thereon, disposed in heat exchange relationship relative to the heat source. A plurality of support legs are capable of supporting the cooker/smoker on a table and On the ground in alternate configurations.

U.S. Pat. No. 4,553,525 (Ruble) discloses a portable grill assembly for use with an extraneous fire source, with a flat grill for supporting a comestible is distally supported by a an elongated bar having, at its opposite end, and insulated hand grip for removing the grill from the vertical stand on which the grill is supported.

U.S. Pat. No. 4,962,697 (Farrar) discloses a pivotable cooker with two positions, one for cooking and one for smoking, food. Pivoting the grill around the povot point allows the cooker to be used for grilling.

U.S. Pat. No. Des. 409,436 shows the ornamental design for a barbeque kettle grill.

SUMMARY OF THE INVENTION

What is disclosed is an improved barbecue grill for outdoor cooking, having an upper cooking chamber portion; a lower fuel storage portion and a countertop member. The upper cooking chamber portion is made up of a hollow cylindrical drum, having a planar rack portion supported horizontally therein. Drum has first and second end plates and a sidewall, with an opening downward in said drum sidewall. A an arcuate door movably hinged is located on the upward side of said drum. The drum is horizontally positioned and supported upon said countertop member.

The countertop member is supported on the lower fuel storage portion. It has an opening therethrough. The lower fuel storage portion is a vertical skirt portion, having an opening upwardly and a bottom plate. A pair of doors covers an aperture in the skirt portion for accessing the interior of said skirt portion. A fuel shelf and a sliding shelf portion for removal of ashes are located inside of the skirt portion.

The countertop portion is disposed between the drum and skirt portions, with the opening therethrough creating a heat induction flue for transfer of heat from the fuel storage chamber to the upper cooking chamber, such that when fuel is placed on said fuel shelf within the skirt portion in said lower fuel chamber, and ignited, the heat therefrom radiates upwardly into said upward cooking chamber, causing food disposed upon said rack to be barbecued.

It is an object of the present invention to provide an improved barbecue grill having a large capacity for fuel and cooking surface.

It is another object of the present invention to provide a barbecue grill having an enlarged fuel portion which also serves as a stand for the upper cooking portion and countertop.

Yet another object of the present invention is to provide a barbecue with a plurality of features such as countertop, storage drawer, smoke pipe, air vents, drain hole, extra shelf racks for cooking and temperature gauge for monitoring the internal cooking temperature.

Another object of the present invention is to provide removable grills and grates for easy cleaning.

A further object of the present invention is to provide a firebox with access doors and a grate for stoking a wood or charcoal fuel fire in a lower chamber.

DETAILED DESCRIPTION OF THE INVENTION

Detailed Description of the Drawings

Figure 1:
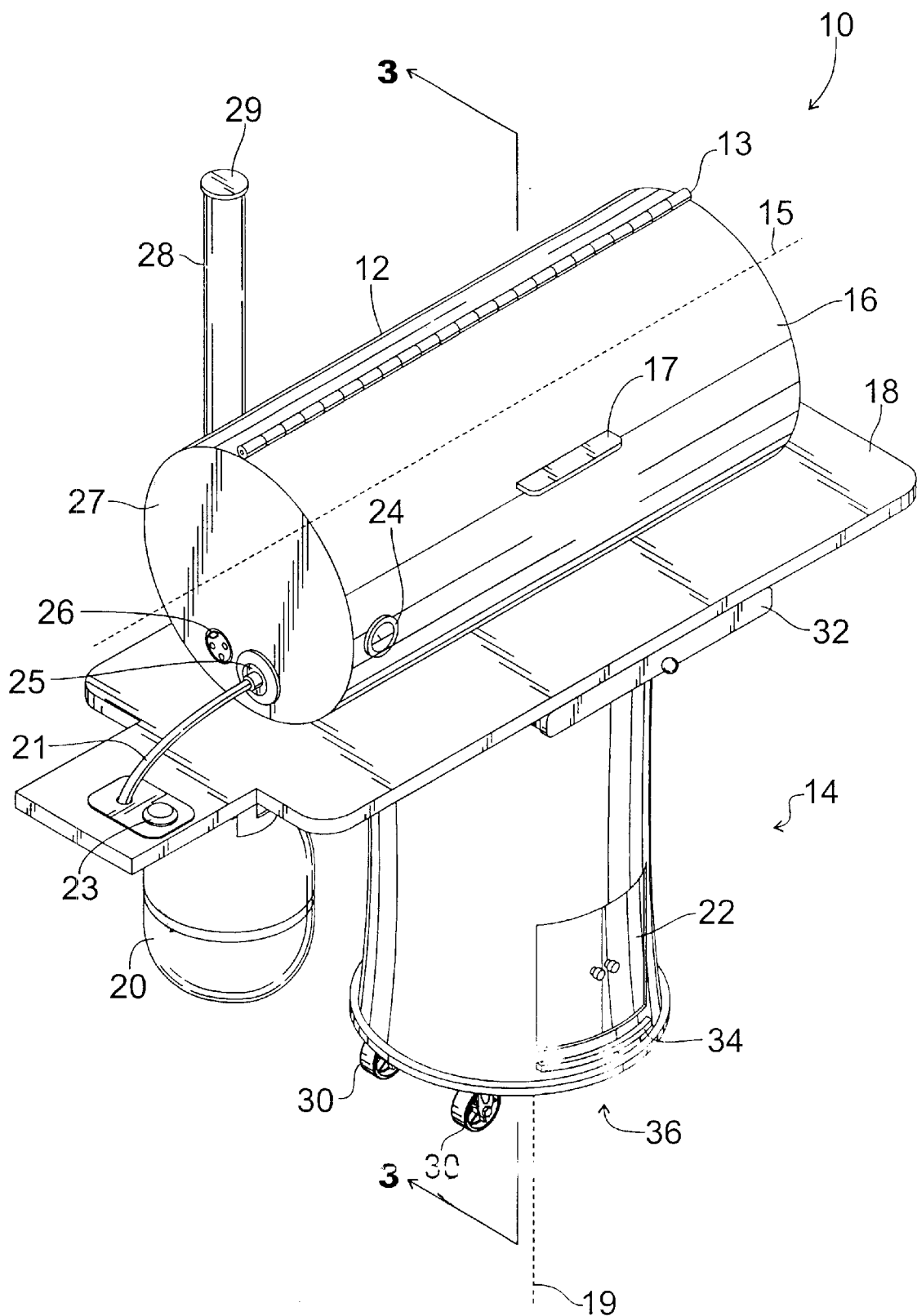
FIG. 1 is an isometric view of the barbecue grill.

Referring first to FIG. 1, a barbeque grill is generally designated as 10. A drum portion 12 is fastened to counter top 18. Drum 12 is fastened sideways, along an imaginary axis 15 extending in a horizontal plane. Drum 12 is a hollow, generally cylindrical container which has a continuous hinge 13 along an exterior line connecting the circular end plates 27, 27A. Hinge 13 is connected to an arcuately shaped door 16 having handle 17 with which to raise the door to expose the interior cavity of the drum 12.

A lower portion of the grill 10 comprises a skirt 14 which is also generally cylindrical. Axis 19 of skirt 14 is oriented in the vertical position, orthogonal to the axis of drum 12. Countertop 18 and drum 12 are perched atop skirt 14. Skirt 14 provides both vertical support for counter top 18 and drum 12, and a hollow cavity for the insertion of combustible fuel which may be inserted through door opening 22. Ash clean out tray 34 is disposed adjacent the bottom circular plate 36. Tray 34 is slidably removable from the lower portion of skirt 14 so as to permit withdrawal of ash residue which collects at the bottom. The skirt portion 14 may optionally be mounted upon casters 30, which facilitate moving the barbeque grill 10.

Countertop 18 is made of a thick, durable and heat resistant sheet material, such as a metallic encased particle board or similar heat resistant slab approximately ¾ to 1½ inches thick, and capable of supporting approximately 50 to 100 pounds of static load. A drawer 32 is slidably mounted on the underside of counter top 18 and provides storage space for cooking utensils, spices, ignitor fluid and the like.

A hollow, cylindrical exhaust pipe 28 extends vertically from the sidewall at one end of the drum 12. Exhaust pipe 28 extends into the hollow cavity of drum 12 in fluid communication with the atmosphere at the top of the exhaust pipe 28. A cap portion 29 is hinged atop pipe 28, so as to open only upon an increase in pressure within pipe 28, to exhaust hot products of combustion to the atmosphere, and also to close by gravitational forces when not cooking, so as to prevent the infiltration of water and condensate. End plate 27 includes a pair of apertures 26, 25. First aperture 26 comprises an adjustable vent with a perforated plate 26A which is rotatable against wholes in the end plate 27, so as to permit the increase or decrease of air flow to the interior cavity of drum 12. When the door 16 is closed, and the adjustment vent 26 is also closed, there is insufficient air permitted within the interior cavity of drum 12 to permit fuel to burn and the combustion within the chamber is shut off due to lack of oxygen. Second aperture 25 includes an escutcheon plate for attaching tubing 21 to the escutcheon plate at one end and to the fuel tank 20 at the other end. Ignitor switch 23 may include a spark generating push button 23. Fuel tank 20 is removably attached to the underside of counter top 18 adjacent one end of drum 12.

Figure 2:
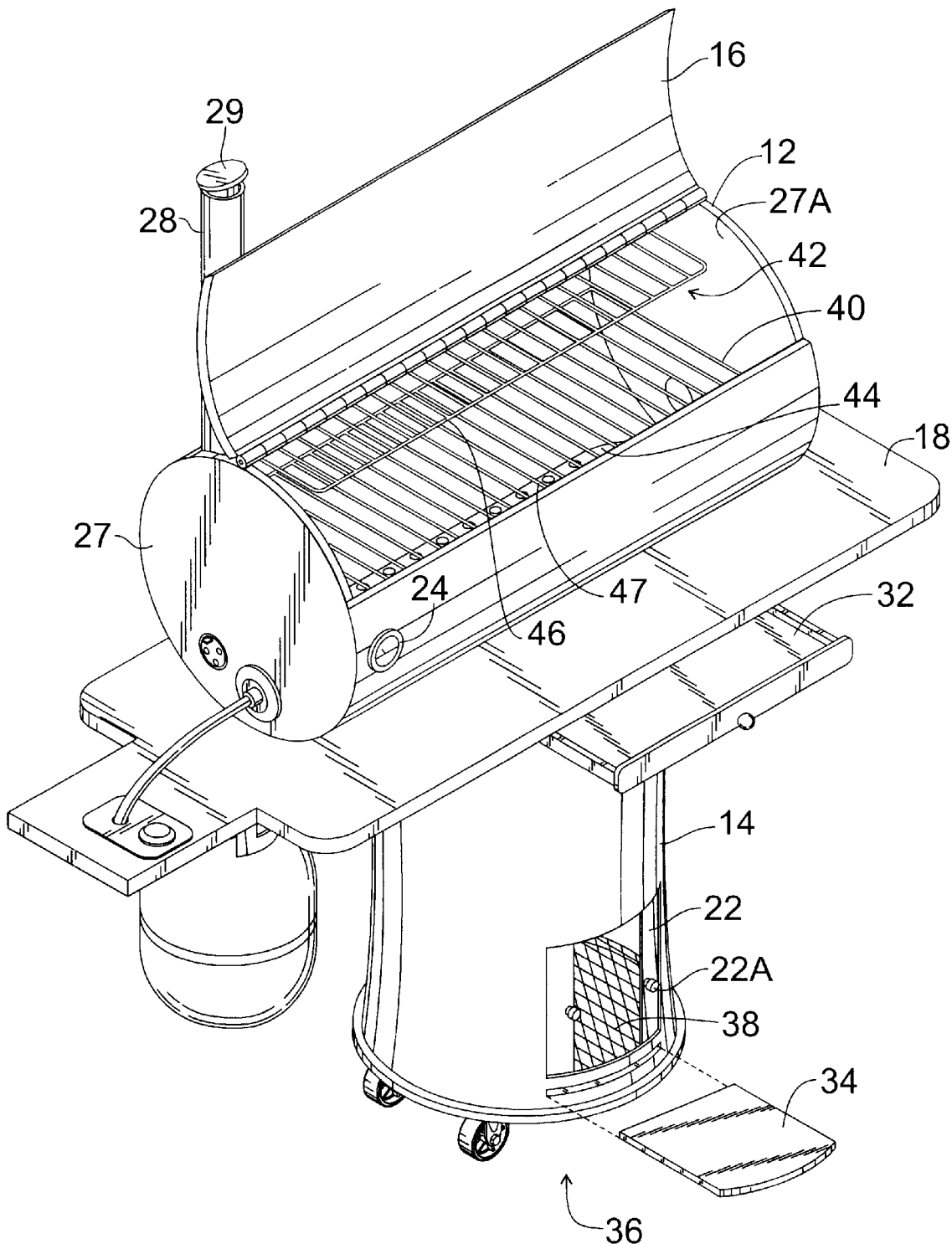
FIG. 2 is an isometric view of the barbecue grill with the drum door open.

Referring next to FIG. 2, lower doors and 22A are illustrated in the open position and an exploded view illustrates the ash tray 34 withdrawn from the interior of skirt 14. Within the hollow cavity of skirt 14 adjacent bottom plate 36 is a mesh grating 38 which serves as a support for a fossil fuel, such as wood, charcoal briquettes or coal which may be placed upon the mesh grating 38 and ignited as fuel for cooking the food contents of drum 12. Drawer 32 is illustrated in the extended position such that the cook may reach in to remove whatever utensils, spices or materials may be stored within for convenience.

Within drum 12, a pair of racks 40 and 42 are suspended within the interior cavity of drum 12 and span the length of drum 12 between end plates 27 and 27A. A burner assembly 44 is partially visible in the lower section of drum 12 beneath rack 40. Racks are comprised of a rigid wire assembly having a rectangular frame 46 with a polarity of transverse legs connecting the longitudinal frame members 46 spaced at approximately one-half inch to one inch intervals, to support a comestible upon the grate while allowing exposure to the underlying flames for cooking purposes. In FIG. 2, the arcuately profiled door is swung in the open position. A temperature gauge 24 is mounted on the external wall of drum 12, with the sensor located within the interior of drum 12 such that the gauge 24 gives an indication of temperature within the drum for cooking. Exhaust pipe 28 cap portion 29 in this instance is illustrated in the open position to vent the exhaust gases (not shown) to the outside atmosphere.

Figure 3:
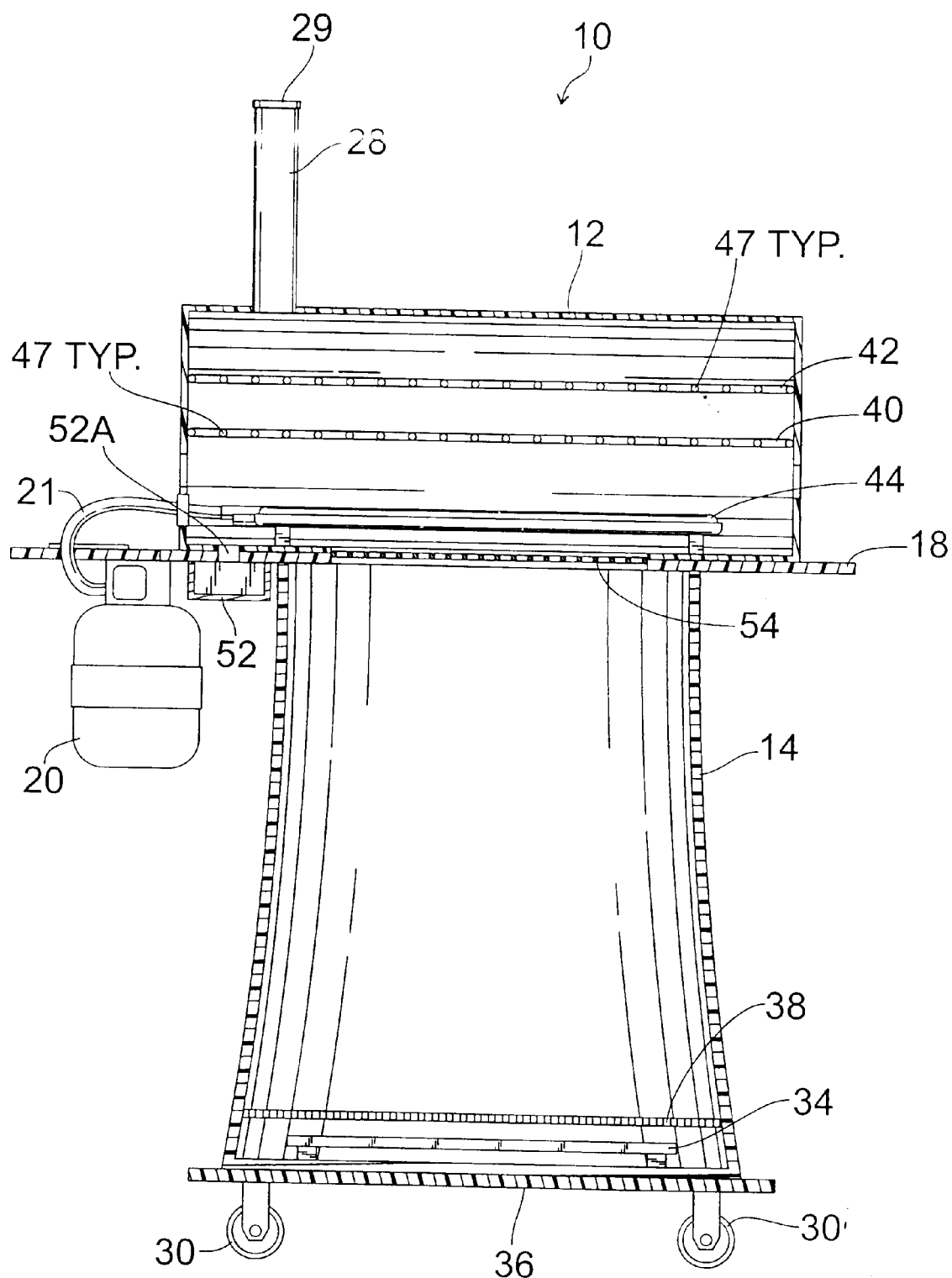
FIG. 3 is an elevational cross-section taken along the lines 3—3 in FIG. 1.

Referring next to FIG. 3, the cross sectional view of grill 10 shows an entire elevational cross section taken along the lines 3—3 in FIG. 1. The propane tank and fuel burning assembly 20, 44, and connecting hose connecting tube 21 are illustrated. These numbers form the alternative fuel for cooking on the grill 10. Thus the grill 10 may be used to cook with a propane gas or other fluid fuel, or the hollow skirt portion 14 may be loaded with a fossil type fuel such as hard wood such as hickory or cherry which are useful for smoking red meats and poultry such as turkey, at a lower temperature over longer periods of time. The lower mesh grating 38 is illustrated adjacent the bottom plate 36 and spaced in a horizontal plane above tray 34 to allow ash residue from the fuel (not shown) to fall onto tray 34 for a clean out removal.

Also in FIG. 3, an aperture 52A is shown adjacent the fuel tank 20, at one end of drum 12 and through the counter top portion 18. The drip pan 52 is removably attached beneath drip hole 52A to capture liquids which may accumulate on the bottom of drum 12. In addition, a large aperture 54 extends approximately ¾'s to ⅞'s of the width of skirt 14 and penetrates through counter top 18, to provide fluid communication between the interior cavity of skirt 14 ad the interior cavity of drum 12, for convection of heat from the fuel burning within skirt 14 to the comestible contents of drum 12. Top rack 42 and bottom rack 40 are shown in cross section with the cross supports 47 extending perpendicular to the plane of the figure. Casters 30 and 30C are displayed in an elevational profile, so as to illustrate the portability of the barbeque grill 10.

Figure 4:
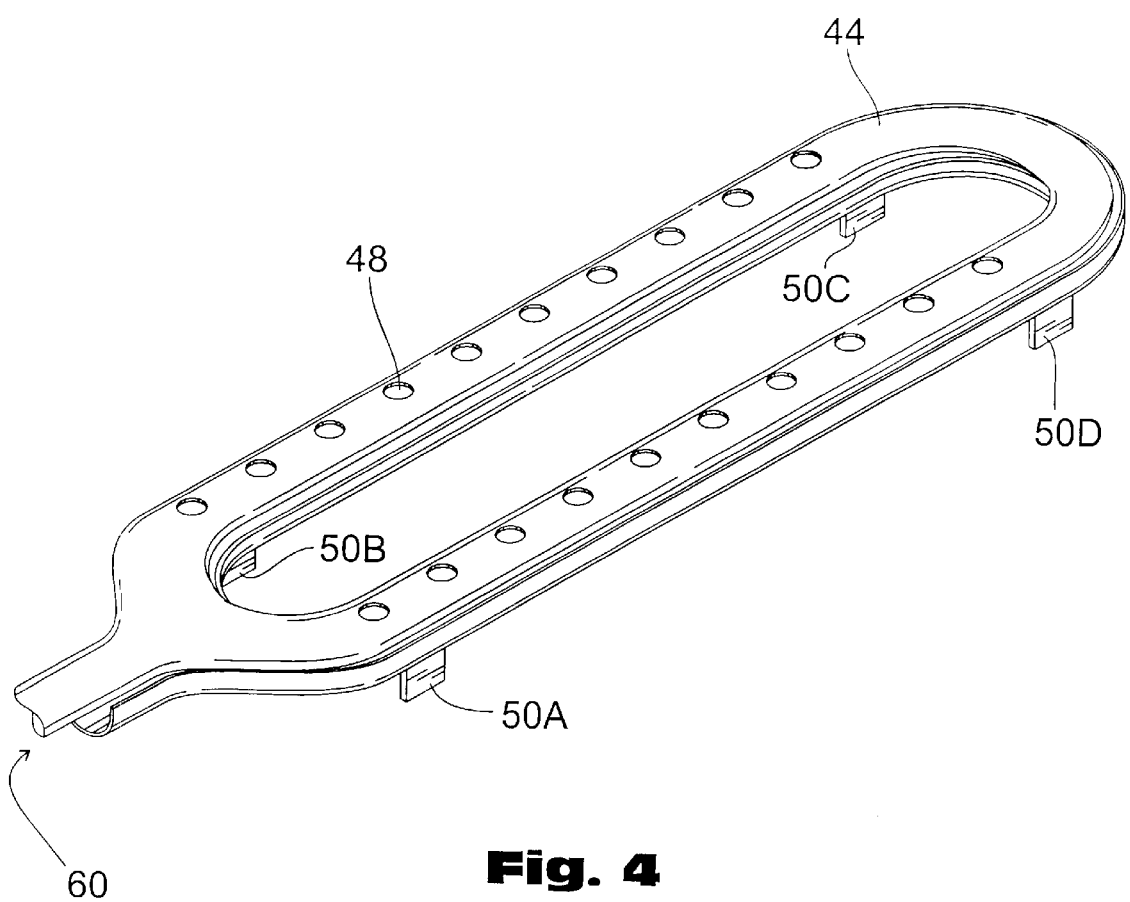
FIG. 4 is a gas burner for burning fuel in the drum portion.

Referring next to FIG. 4, a burner assembly 44 is illustrated. Assembly 44 includes a polarity of apertures 48, for controlling the direction and flow of pressurized gas out of the ports at the points of combustion. A polarity of bosses 50A–50D are attached to the underside of burner assembly 44 to provide spacing of the burner away from the bottom. In inlet plate 60 is connected to gas tube 21 to allow the flow of gas into burner assembly 44 and distribution to the apertures 48 for combustion of the gas fuel.

According to the provisions of patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. An improved barbecue grill for outdoor cooking comprising:

an upper cooking chamber portion; a lower fuel storage portion; and a countertop member;

said upper cooking chamber portion further comprising a hollow cylindrical drum, having a planar rack portion supported horizontally therein, and having first and second end plates and a sidewall; an opening downward in said drum sidewall; an arcuate door movably hinged on the upward side of said drum, said drum being horizontally positioned and supported upon said countertop member;

said countertop member being supported on said lower fuel storage portion; having an opening therethrough;

said lower fuel storage portion further comprising a vertical skirt portion, having an opening upwardly and a bottom plate; a pair of doors covering an aperture in said skirt portion for accessing the interior of said skirt portion; a fuel shelf; and a sliding shelf portion for removal of ashes;

said countertop portion being disposed intermediately of said drum and said skirt portions, with said opening therethrough creating a heat induction flue for transfer of heat from the fuel storage chamber to said upper cooking chamber; such that when fuel is placed on said fuel shelf within said skirt portion in said lower fuel chamber, and ignited, the heat therefrom radiates upwardly into said upward cooking chamber, causing food disposed upon said rack to be barbecued.

2. Claim 1, wherein said lower fuel chamber portion also having four wheels symmetrically located beneath said bottom plate, and rotatably connected thereto to facilitate movement of said barbecue grill.

3. Claim 1, wherein said drum also having a gauge for outwardly displaying the inner temperature of the drum portion; and temperature sensing means incorporated therein.

4. Claim 1, wherein said barbecue grill also having a liquid fuel tank depending from said countertop, a flexible tubular conduit fluidly coupled to a burner member, with a valve disposed between said tank and said conduit for regulating the flow of fuel between the tank and burner member.

5. Claim 4, wherein also providing an ignition means for automatically igniting said liquid fuel.

6. Claim 1, wherein said countertop portion having a horizontally slidable drawer depending therefrom for storage of cooking implements and accessories.

7. Claim 1, wherein said first and second end plates each having an adjustable ventilation means for adjusting the amount of air infiltrating into the upper cooking chamber for combustion.

8. Claim 1, wherein said upper cooking chamber also having an exhaust pipe in fluid communication with said hollow cylindrical drum portion and extending upward for discharge of products of combustion from the interior of said drum portion.

9. Claim 1, wherein said drum portion also having a drip can mounted on the lowest most side of said drum, for collection of juices from cooking of meat and other fat-containing items.

* * * * *